United States Patent

Lessing et al.

[11] Patent Number: 5,854,675
[45] Date of Patent: Dec. 29, 1998

[54] METHOD FOR MEASURING INJECTION BORES OF FUEL INJECTION VALVES FOR INTERNAL COMBUSTION ENGINES

[75] Inventors: Ulrich Lessing, Stuttgart; Heinz-Arno Marto, Weil Der Stadt; Reiner Kaess, Ludwigsburg, all of Germany

[73] Assignee: Robert Bosch GmbH, Stuttgart, Germany

[21] Appl. No.: 821,556

[22] Filed: Mar. 21, 1997

[30] Foreign Application Priority Data

Mar. 23, 1996 [DE] Germany ................ 196 11 613.9

[51] Int. Cl.$^6$ .................................................. G01N 21/00
[52] U.S. Cl. .............................................................. 356/241
[58] Field of Search ................................ 356/241, 240, 356/237

[56] References Cited

U.S. PATENT DOCUMENTS 4,268,169   5/1981   Stenning ........................... 356/241

FOREIGN PATENT DOCUMENTS

| 0 181 122 | 5/1986 | European Pat. Off. . |
| 7 260 438 | 10/1995 | Japan . |
| 1553826 | 10/1979 | United Kingdom . |
| 2 287 092 | 9/1995 | United Kingdom . |

OTHER PUBLICATIONS

Bosch Diesel–Reiheneinspritzpumpen pp.38–39.

Primary Examiner—Frank G. Font
Assistant Examiner—Reginald A. Ratiff
Attorney, Agent, or Firm—Edwin E. Greigg; Ronald E. Greigg

[57] ABSTRACT

A method and apparatus for measuring injection bores of fuel injection valves for internal combustion engines, in which the injection valve including the bores to be measured is fastened in a receiving device and the bore is measured with a measuring device. The ascertainment of the location and geometry of the bore to be measured is done by means of an optoelectronic measuring method such as a camera.

8 Claims, 1 Drawing Sheet

METHOD FOR MEASURING INJECTION BORES OF FUEL INJECTION VALVES FOR INTERNAL COMBUSTION ENGINES

BACKGROUND OF THE INVENTION

The invention is based on a method for measuring injection bores of fuel injection valves for internal combustion engines.

In fuel injection valves of the "hole nozzle" type, known for instance from Bosch's "Technische Unterrichtung Diesel-Reiheneinspritzpumpen" [Technical Instruction, Diesel In-Line Injection Pumps], 1994/95 edition (1 987 722 012; KH/VDT-09.94-De), pp. 38–39, the location and formation of the injection bores (or ports) leading radially away from a central axial bore in the valve body have major significance in terms of the location and formation of the injection stream into the combustion chamber of the internal combustion engine. Since the quality of combustion in the engine combustion chamber is highly dependent on an optimal injection stream (penetration depth, location, atomization), precision manufacture of the injection openings of the injection valve is necessary, especially for the sake of optimal preparation and combustion of the fuel.

However, the problem then arises of also being able to measure these injection bores very precisely, so that possible positional or tolerance deviations during manufacture can be reacted to quickly. Previously, the possible ways of measuring the injection bores were limited to conventional mechanical measuring methods or measured values ascertained by means of enlarging cut-open injection port bores; the measurement results ascertained by conventional measuring methods are not sufficiently accurate, and grinding bores open is very expensive and also destroys the injection valve.

OBJECT AND SUMMARY OF THE INVENTION

The method according to the invention for measuring bores, especially injection bores in fuel injection valves for internal combustion engines, has the advantage over the prior art that very accurate measuring of the bore geometry and in particular of the cross section of the bore inlet edges and the location of the bores is possible. The contactless optoelectronic measuring method can be used in mass production of injection valves, and an appropriate measuring device can be integrated into the production line. In this way, even the slightest deviations from the desired geometry can be detected, and suitable error correction can rapidly ensue, which has a favorable effect on the overall quality of the fuel injection valves produced. It should be noted that this kind of measuring method can also be used for other objects that have relatively poorly accessible openings in bores, in which the location and geometry of the opening or bore are of major significance. Such objects may likewise originate in fuel injection technology, such as pumps or valves, but other technological fields are also possible, such as precision mechanics and hardware technology.

The optoelectronic measuring device is advantageously embodied by a camera, whose optical axis is aligned (scanning alignment) with the axis of the bore to be measured, and which during the measuring operation measures at least the inlet and outlet edges of the bore, focusing on these edge regions in succession. Additional measurement points in the course of the bore are alternatively also possible.

For axial alignment of the bore to be measured with the optical axis of the camera, and for an unambiguous positional definition of the object to be measured, preferably the fuel injection valve and in particular the valve body thereof in this case, this object is fastened in a clamping chuck, which is freely displaceable in three planes and is disposed pivotably on a measurement table that in turn is embodied such that measurement inaccuracies from vibration are precluded.

The data ascertained by the camera, in combination with the values established at the clamping chuck and measuring table and the known geometrical dimensions of the valve body, are converted in a connected evaluation unit, by suitably adapted software, into the geometric indications about the position and geometry of the injection bore to be measured, in proportion to specific data of the valve body, and are indicated or displayed. In this way, it is possible for instance to obtain precise indications of the diameter of the injection bore, its conicity, angular position and disposition relative to the axis of the rotationally symmetrical valve body, and the axial spacing thereof from a reference edge on the valve body.

To enable performing a precise optical measurement of the bore, this bore is inventively illuminated from the inside. The delivery of light to the bottom of the bore to be measured is advantageously done by means of suitable fiberoptical waveguides. To that end, a receiving mandrel shaped to match the shape of the movable valve member, is inserted instead of the valve member into the central axial bore of the valve body; this mandrel has an axial through bore into which at least one waveguide rod, embodied as a glass rod, is inserted. This glass rod protrudes from the receiving mandrel at the level of the inlet opening of the injection bore and thus projects light to the bottom of the bore to be measured. To avoid impairment from glare or mirror reflection, the surface of the glass rod is embodied such that diffuse light is projected. This can be accomplished in a simple way by leaving the surface of the glass rod unpolished. To assure optimal illumination for various valve embodiments, such as inlet regions of the injection bores disposed at various axial levels, as well as to increase the luminance and avoid light loss, two glass rods one after the other are preferably provided in the receiving mandrel; of them, the rear glass rod, remote from the measurement point, widens in cross section in the manner of a bottle and is connected by its larger-diameter free end to a flexible waveguide cable; as an alternative, other light sources are also possible. The front glass rod, ending at the measurement point, tapers conically to a point on its free end, the cone angle preferably being between 30° and 60°. These characteristics may alternatively also be provided on a single common glass rod.

The invention will be better understood and further objects and advantages thereof will become more apparent from the ensuing detailed description, as taken in conjunction with the drawings, of a preferred embodiment of the method of the invention for measuring bores, especially injection bores in fuel injection valves for internal combustion engines, and of an apparatus for performing this method.

DESCRIPTION OF THE PREFERRED EMBODIMENT

Figure 1:
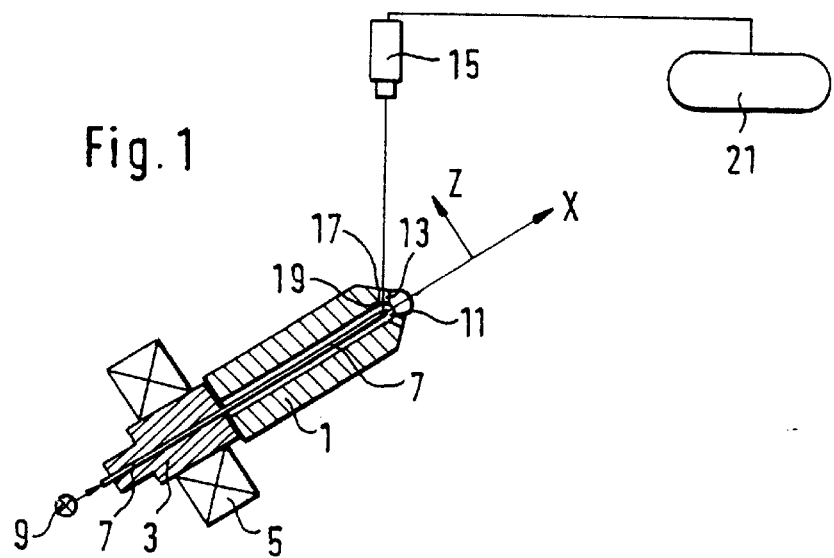
FIG. 1 shows a schematic view of the functional principle of the measuring method.

In the functional principle, shown in FIG. 1, of the method according to the invention for measuring bores, the object to be measured, in the exemplary embodiment that valve body 1 of a fuel injection valve is fastened via a receiving mandrel 3 in a clamping chuck 5, which in turn is disposed on a measurement table, not shown, and enables a free adjustment of the valve body in three planes. The receiving mandrel 3 has various stops, for the sake of accurate positioning of the valve body 1. At least one waveguide rod 7 is inserted into the receiving mandrel 5; with its free end, it is connected to a flexible waveguide cable 9 that originates at a light source, and its other end extends from the receiving mandrel 3 to end in a chamber 11 inside the valve body 1, from which the injection bore 13 to be measured leads away, so that the bottom of this bore is illuminated from the inside.

For the sake of an accurate geometric association of the location of the receiving mandrel 3 and the valve body 1, the valve body is aligned in such a way that the axis of the mandrel and the X axis are parallel. Deviations in concentricity of the clamping chuck 5 or of the receiving mandrel 3 are measured and corrected. In addition, the injection bore 13 to be measured is positioned by feel in such a way that the respective bore axis is centered with the optical axis of a camera 15 acting as the optoelectronic measuring device.

In the actual measuring operation, the inlet edges 17 and outlet edges 19 are measured in succession by suitable focusing of the camera 15, and the ascertained measurement results are converted, as a function of the previously picked-up geometrical data about the location of the valve body 1, into measurement results on the bore axis, height angle, side angle, three-dimensional location of the injection bore 13, and indications about the bore geometry, in a connected evaluation unit 21 by means of suitable software, and displayed or indicated.

Figure 2:
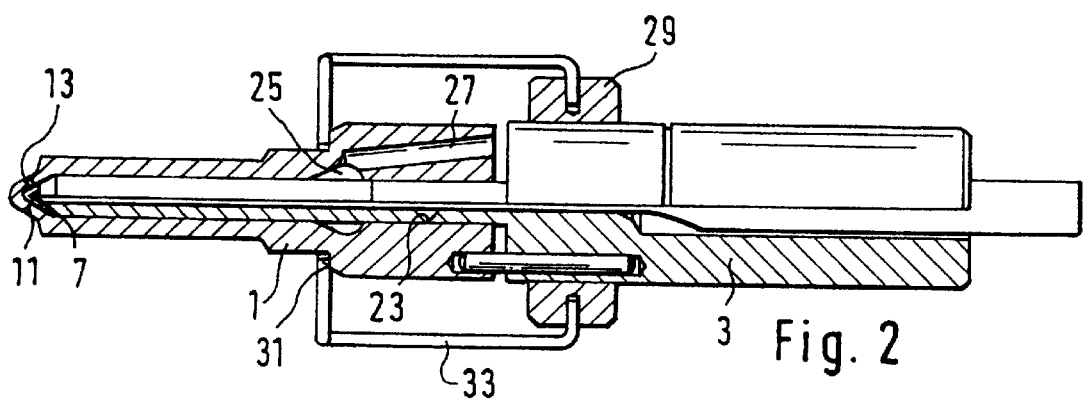
FIG. 2 is a section taken through the valve body to be measured, with the receiving mandrel secured to it.
Figure 3:
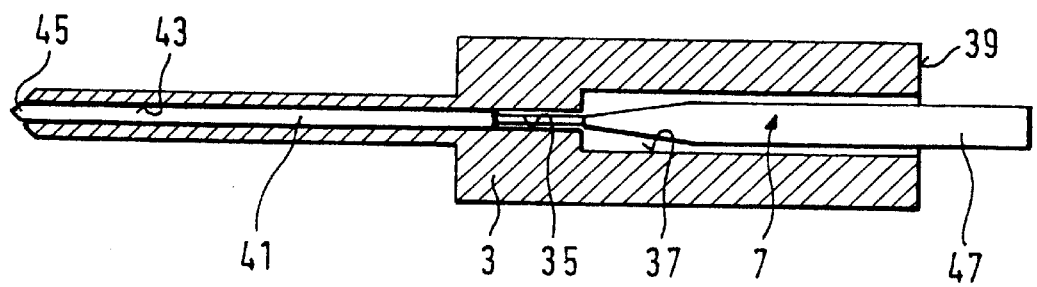
FIG. 3 is an enlarged sectional view through the receiving mandrel of FIG. 2, with waveguide rods inserted.

In FIG. 2, a sectional view of the valve body 1 to be measured, with the receiving mandrel 3 inserted, and in FIG. 3 an enlarged view of the receiving mandrel 3 with inserted waveguide rods 7 are shown in accordance with the function diagram of FIG. 1.

The valve body 1 of a fuel injection valve of the "hole nozzle" type for internal combustion engines is embodied in a known manner as a rotationally symmetrical, stepped body in whose interior an axial blind bore 23 is provided; a valve member is guided axially displaceably in this blind bore 23 in the mounted and built-in state. The blind bore 23 has a pressure chamber 25, formed by a cross-sectional widening, in which a fuel supply line 27 ends. The chamber 11 is formed on the closed end of the blind bore 23, and at least one injection bore 13 leads radially away from the blind bore 23 in this chamber 11.

During the measuring method of the invention, a cylindrical receiving mandrel 3 is inserted into the blind bore 23 instead of the valve member; it is introduced into the blind bore 23 until it contacts a defined stop, not identified by reference numeral, and thus defines the chamber 11 axially with its conical face end.

A clamping device 29 may be provided on the circumference of the receiving mandrel 3; it keeps the receiving mandrel 3 in axial contact with the valve body 1 and is braced on the valve body 1 for instance by means of a hoop 33 that engages an annular shoulder 31 of the valve body 1.

The stepped receiving mandrel 3, as shown in FIG. 3, has an axial through bore 35, which is embodied as a stepped bore; the larger-diameter bore portion 37 ends at the free end face 39 remote from the valve body 1. For optimal adaptation to various conditions of the valve body 1 to be measured or of the injection bores 13 provided in it, two waveguide rods 7 are disposed movably and one after the other, being formed of suitably shaped glass rods and having approximately the same length. A first glass rod 47 of small diameter, preferably 1.5 mm, is inserted in such a way into the reduced-diameter portion 43 of the through bore 35 that it protrudes with its conical tip out of the receiving mandrel 3 into the chamber 11. Resting on the end of the first glass rod 41 remote from the tip 45 is a second glass rod 47, whose cross section increases uniformly, preferably in bottle-like fashion, to a larger diameter in the region of the larger-diameter bore portion 37, the increase being approximately 5 mm, and whose free end protrudes out of the receiving mandrel 3 for the sake of connecting the flexible waveguide, which preferably is a glass fiber cable. The glass rods 41, 47 are inserted into the receiving mandrel 3 in such a way that with their adjacent end faces they constantly rest flat against one another, thus assuring reliable transmission of the light radiation as far as the inside of the closed blind bore chamber 11.

With the method of the invention for measuring bores, it is thus possible to measure the location and geometry of blind bores very accurately as well; the automatable method can also be used within a production line in mass production.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for measuring injection bores of fuel injection valves for internal combustion engines, which comprise fastening an object to be measured in a receiving device, adjusting the object to be measured prior to a measuring operation by means of the receiving device in a geometrically defined position with a measuring device, ascertaining a location and geometry of the bore to be measured, during the measuring operation successively measuring inlet edges (17) and outlet edges (19) of the bore (13) to be measured by means of an optoelectronic measuring system.

2. The method in accordance with claim 1, which comprises inserting a radiation source into an interior of a hollow body including rectilinearly extending bores that connect an interior of said hollow body with an outside.

3. The method in accordance with claim 1, which comprises converting the geometric location of the object in the receiving device and the measurement results of the optoelectronic measuring method by means of a suitable evaluation program in a connected evaluation unit (21) into geometrical data of the bore to be measured and are displayed or indicated.

4. An apparatus for measuring injection bores of fuel injection valves for internal combustion engines, which comprises a receiving device formed by a clamping chuck (5) that is displaced freely in three planes and is pivotable about an axis, a valve body including said injection bores is secured in said clamping chuck (5), means for illuminating said injection bores, means for directing an optoelectronic measuring device toward at least one injection bore and centering said optoelectronic measuring device along an axis of the bore measured.

5. The apparatus in accordance with claim 4, in which means are provided by way of which the bore (13) to be measured is illuminated from inside, and the illuminating means are embodied by fiberoptical waveguides (7), which are inserted into an axial bore (23) of the valve body (1) of the fuel injection valve, from which axial bore the injection bore (13) to be measured leads radially away.

6. An apparatus in accordance with claim 5, in which the waveguide (7) disposed inside the valve body (1) is embodied as at least one glass rod (41, 47), with a free end that protrudes from the valve body (1), and to which a flexible waveguide cable (9) can be connected.

7. An apparatus in accordance with claim 6, in which the least one glass rod (31, 47) is inserted movably into a receiving mandrel (3), which in turn is inserted into the axial bore (23) in the valve body (1) of the injection valve, add one tip (45) of the glass rod (41) protrudes axially out of the receiving mandrel (3) into a chamber (11), at,a level of the injection bore (13) to be measured.

8. An apparatus in accordance with claim 5, in which the means that illuminates the bore to be measured projects diffuse light.

* * * * *